(12) United States Patent
Hinchliffe et al.

(10) Patent No.: US 7,840,663 B1
(45) Date of Patent: Nov. 23, 2010

(54) DESKTOP SECURITY IN PEER-TO-PEER NETWORKS

(75) Inventors: Alex J. Hinchliffe, Buckinghamshire (GB); Andrew Kemp, Oxford (GB); Bobby Rai, Northants (GB); Fraser P. Howard, Oxon (GB)

(73) Assignee: McAfee, Inc., Santa Clara, CA (US)

( * ) Notice: Subject to any disclaimer, the term of this patent is extended or adjusted under 35 U.S.C. 154(b) by 759 days.

(21) Appl. No.: 10/028,412

(22) Filed: Dec. 21, 2001

(51) Int. Cl.
*G06F 15/173* (2006.01)
(52) U.S. Cl. .................................................. 709/224
(58) Field of Classification Search ................ 709/204, 709/224, 219; 713/210
See application file for complete search history.

(56) References Cited

U.S. PATENT DOCUMENTS

| | | | | |
|---|---|---|---|---|
| 5,862,335 A * | 1/1999 | Welch et al. | | 709/224 |
| 5,991,881 A * | 11/1999 | Conklin et al. | | 713/201 |
| 6,044,402 A | 3/2000 | Jacobson et al. | | |
| 6,321,338 B1 * | 11/2001 | Porras et al. | | 713/201 |
| 6,381,632 B1 * | 4/2002 | Lowell | | 709/203 |
| 6,421,319 B1 * | 7/2002 | Iwasaki | | 370/230 |
| 6,484,203 B1 * | 11/2002 | Porras et al. | | 709/224 |
| 6,636,854 B2 * | 10/2003 | Dutta et al. | | 707/10 |
| 6,675,205 B2 * | 1/2004 | Meadway et al. | | 709/219 |
| 6,766,364 B2 * | 7/2004 | Moyer et al. | | 709/221 |
| 2002/0078381 A1 * | 6/2002 | Farley et al. | | 713/201 |
| 2002/0107953 A1 * | 8/2002 | Ontiveros et al. | | 709/224 |
| 2003/0097299 A1 * | 5/2003 | O'Kane et al. | | 705/14 |

OTHER PUBLICATIONS

Clip2 Distributed Search Services. "The Gnutella Protocol Specification v0.4", publicly posted Aug. 15, 2000, <http://web.archive.org/web/20000815052703/http://dss.clip2.com/GnutellaProtocol04.pdf>, 8 pages.*

* cited by examiner

*Primary Examiner*—J Bret Dennison
(74) *Attorney, Agent, or Firm*—Zilka-Kotab, PC

(57) ABSTRACT

A peer-to-peer network is monitored for suspicious activity based on patterns of activity. When a particular pattern of suspicious activity is detected, an action associated with the particular pattern is taken. The activity monitored may include network traffic among peers and data sharing on a peer in the network. The action may be to log information about the suspicious activity and/or to send an alert about the suspicious activity.

43 Claims, 4 Drawing Sheets

DESKTOP SECURITY IN PEER-TO-PEER NETWORKS

FIELD OF THE INVENTION

This invention relates generally to computer security, and more particularly to securing a desktop computer operating in a peer-to-peer network.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2001, Networks Associates Technology, Inc., All Rights Reserved.

BACKGROUND OF THE INVENTION

Client-server networks connect each desktop computer to a server but typically the desktop computers do not directly communicate with one another. In contrast, peer-to-peer (P2P) networks connect individual desktop computers ("peers") one to another and operate without a server. A hybrid "extended" P2P network may employ a server to provide addresses for the peers in the network. P2P networks by their very nature are vulnerable to both security breeches and virus infections.

P2P networks can be split into three main types: file sharing, processor sharing, and instant messaging, each of which presents a cocktail of unique risks that traditional border firewalls and anti-virus software are not designed to combat. For example, some file sharing P2P networks are particularly designed to circumvent border firewalls. Additionally, to participate in an external P2P network, a user typically downloads and executes a binary code program from an external site, thus creating conditions ripe for virus infections.

File sharing P2P networks allow participants to view, and sometimes modify, certain directories and files on another P2P peer. The existence of a file sharing P2P network instead of, or co-existing with, a standard corporate client-server network moves security away from protecting a single point of entry into the corporate network to ensuring the individual desktop computers have appropriate access controls on files and directories. The ease in sharing files at the desktop makes it very easy for sensitive information to leak either intentionally or unintentionally out of an organization. Inexperienced users often choose to share their entire hard drive, exposing all directories, including their cookie files and encrypted passwords, which could be used by a hacker.

Processor sharing P2P systems are designed to use spare processor cycles on each peer to provide a distributed computing environment. Many programs that use this process are valid research programs. In processor sharing, each peer works on its assigned project when it is not engaged in everyday tasks, typically when a screen saver is activated.

Instant messaging systems are replacing the traditional IRC (Internet Relay Chat) as a means of providing real-time, online chat services. The main risks associated with this type of P2P network is the fact that messages transferred between clients (both inside companies and out) travel unencrypted. Most users are unaware that their information could potentially be viewed by a third party with whom they did not explicitly initiate a conversation.

Many corporations are evaluating deployment of P2P networks as a useful and low-cost tool for information and load sharing within an organization and with external partners, but these security issues must be addressed before widespread deployment can be expected.

SUMMARY OF THE INVENTION

A peer-to-peer network is monitored for suspicious activity based on patterns of activity. When a particular pattern of suspicious activity is detected, an action associated with the particular pattern is taken. The activity monitored may include network traffic among peers and data sharing on a peer in the network. The action may be to log information about the suspicious activity and/or to send an alert about the suspicious activity.

The present invention describes systems, methods, and computer-readable media of varying scope. In addition to the aspects of the present invention described in this summary, further aspects will become apparent by reference to the drawings and by reading the detailed description that follows.

DETAILED DESCRIPTION OF THE INVENTION

Figure 1:
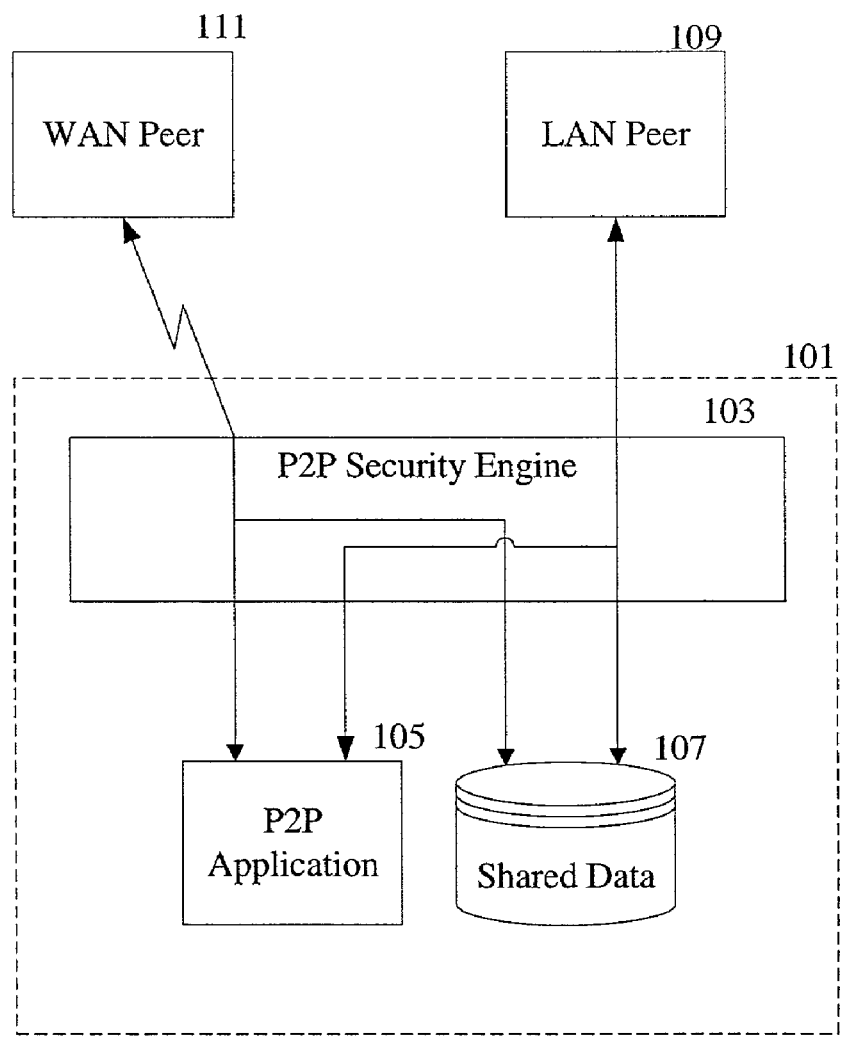
FIG. 1 is a diagram illustrating a system-level overview of an embodiment of the invention.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

A system level overview of the operation of an embodiment of the invention is described by reference to FIG. 1, which illustrates a desktop computer 101 connected into internal and external peer-to-peer (P2P) networks. The computer 101 executes a P2P application 105 to establish communications with an external WAN (wide area network) peer computer 111 or an internal LAN (local area network) peer computer 109. The user of computer 101 has configured the computer 101 to shared data 107 (also referred to as "shares"), such as directories and files. A P2P security engine 103, such as a software firewall, executes on the computer 101 and monitors activity in the peer-to-peer networks, including network traffic between the computer 101 and the peers 109, 111, and file sharing on the computer 101. The P2P security engine 103 is configured through a set of local rules that define suspicious patterns of activity and the action taken by the engine 103 if it detects such suspicious activity in the peer-to-peer network. The set of rules may be input into the engine 103 as parameters or read from a file.

For example, one local rule could specify that all accesses made to the computer 101 by an external peer, such as peer 111, would be logged. The log entry would include information such the date, time, network address, and any shares accessed. This type of rule is designed to detect "Trojan horse" code that is downloaded by the user as a "harmless" executable but when executed, broadcasts itself as a member of a external P2P establishment and/or shares all of the drives of the computer 101 with full rights. Another rule could specify a minimum number of failed attempts that computer 101 is allowed in accessing an internal peer, such as peer 109, before sending an alert to the user or an administrator. This type of rule is designed to detect viruses that propagate through a corporate LAN over a co-existing P2P network. Yet another rule could log P2P network-type traffic, e.g., unencrypted packets or NetBIOS messages, sent from the computer 101. The rule is designed to detect when the user of computer 101 uses a P2P file sharing application 105 to browse the hard drives of peers 109, 111 for data. Still another rule could configure the P2P security engine 103 with both an incoming and an outgoing range of network address and direct the engine 103 to alert the user or administrator if an access to the computer 101 is from a "foreign" address outside the range. Conversely, the rule could cause the engine 103 to alert when the computer 101 attempts to access a "foreign" network address range, whether it be due to a nosey user or a piece of malicious code trying to contact "home."

The P2P security engine 103 also may be configured through rules or input parameters to record the shares and associated permissions on the computer 101. Furthermore, a baseline of authorized shares and permissions can be established on the computer 101 and a local rule defined that causes the P2P security engine 103 to log or alert when it detects changes to the baseline.

As shown in FIG. 1 and described above, the P2P security engine 103 executes on an individual desktop computer, but the invention is not so limited. The P2P security engine 103 may also operate as a component of, or in conjunction with, a border firewall for a co-existing corporate client-server network. In such an implementation, the rules would be global to the entire network. For example, one global rule could direct the engine 103 to log all P2P network-type traffic sent to the firewall. Another global rule could define network ranges as described previously.

The P2P security engine 103 may also execute on a corporate domain name server (DNS) to log suspicious email activity since many viruses and other malicious code send email to an external address when they have completed their task. A global rule would direct the engine 103 to alert an administrator if more than a pre-defined number of internal computers request resolution of the same external address within a preset period of time.

It will be appreciated that the P2P security engine 103 can be installed and configured on a desktop computer 101 by the individual user. In a corporate client-server environment, the engine 103 may be installed and configured on the desktop computer, a border firewall, a DNS server, or other server by the network administrator. Additionally, the rules that drive the engine 103 may be available from a centralized location, such as a corporate intranet site, or propagated to the computers through various distribution channels. In one particular distribution mechanism, the rules and instructions for applying the rules to the P2P security engine 103 are encapsulated into a self-contained configuration file. When the self-contained configuration file is executed, the engine 103 is updated with the rules. Details of the self-contained configuration file and a corresponding security policy distribution system are described in U.S. patent application Ser. No. 09/962,901, filed on Sep. 21, 2001 and assigned to the assignee of the present application.

Figure 2:
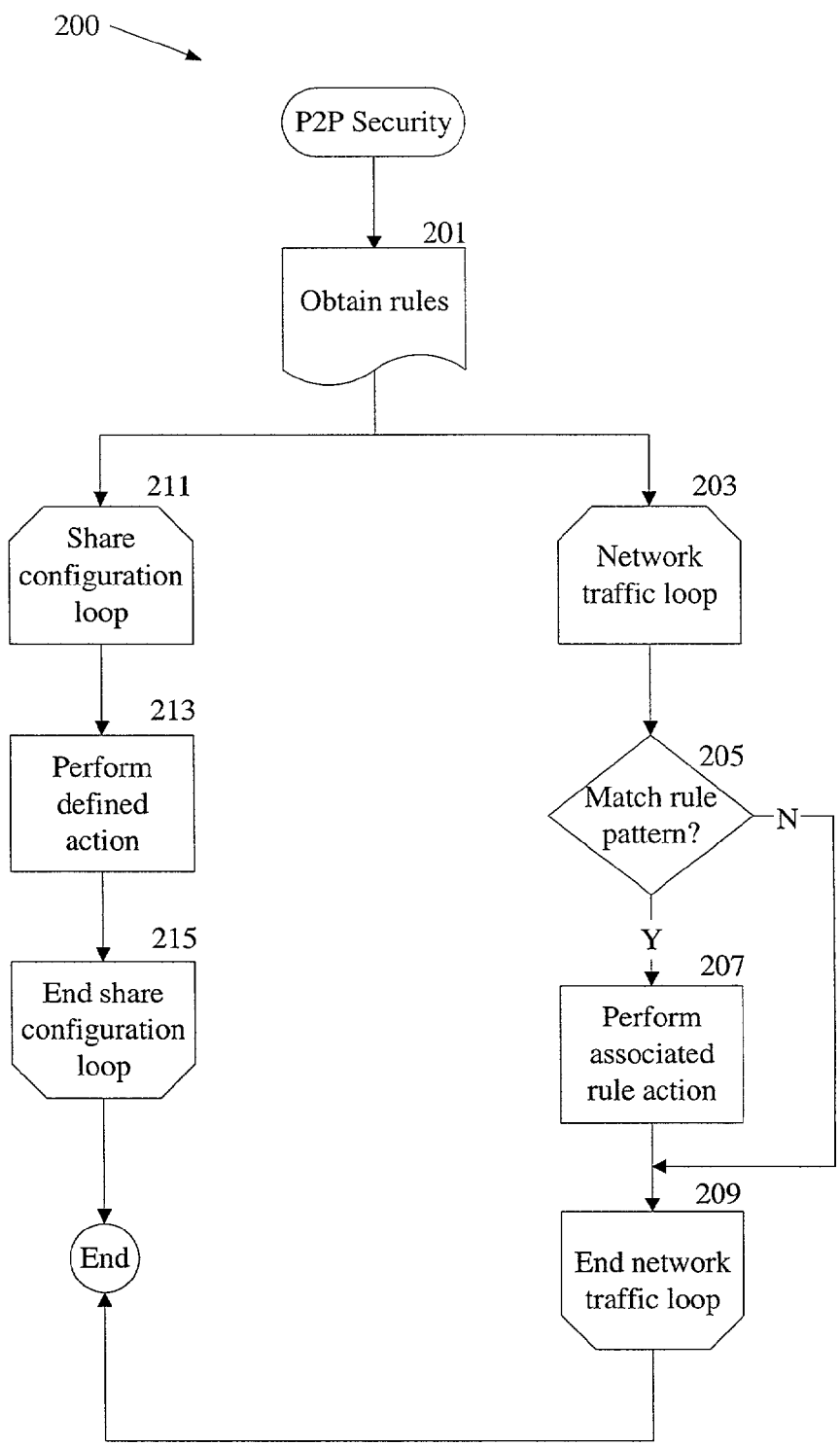
FIG. 2 is a flowchart of method to be performed by a computer according to an embodiment of the invention.

Next, methods to be performed by a computer hosting the P2P security engine 103 in accordance with one embodiment of the invention are described in terms of computer software with reference to a flowchart shown in FIG. 2. The methods constitute computer programs made up of computer-executable instructions. Describing the methods by reference to a flowchart enables one skilled in the art to develop such programs including such instructions to carry out the methods on suitably configured computers (the processor of the computer executing the instructions from computer-readable media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be further appreciated that the acts described in conjunction with FIG. 2 are not required to be performed in the particular order shown and that the processes of the invention may be divided into more or fewer logical blocks than those shown.

Upon invocation, such as when computer 101 is booted, the embodiment of a P2P security method 200 illustrated in FIG. 2 obtains the current rules (block 201). The current rules may be local or global depending on the function of the host computer. The method 200 performs two processing loops in parallel, a network traffic loop (blocks 203 through 209) and a share configuration loop (blocks 211 through 215). The method 200 is terminated when the host computer is shutdown or when the method 200 is manually terminated by a user.

The network traffic loop detects incoming or outgoing traffic for the host computer and determines if it exhibits an activity pattern defined as suspicious by the rules (block 205). If the activity pattern is suspicious, the method 200 performs the action associated with the rule, such as logging or alerting as described above. Non-suspicious activity patterns are ignored.

The share configuration loop detects changes to shares and/or corresponding permissions on the host computer and takes appropriate action (block 213). The action depends on the type of changes made and may be defined in the rules or in other input parameters for the method 200. For example, if the change is to un-share a file or directory, thus reducing the vulnerability of the host computer to attack, only a log entry may be made. In another embodiment not illustrated, the share configuration loop executes on a schedule instead of dynamically, and examines the current share configuration against a previously recorded configuration, such as the baseline configuration described above, to determine if changes have been made and to determine the appropriate action to take if so.

It will be appreciated that the P2P security method 200 will refresh the rules at block 201 when rule changes are made during execution of the method 200. Furthermore, one of skill in the art will immediately recognize that either of the loops illustrated in FIG. 2 may be omitted from the method 200 and that the loops may execute in a serialized fashion without departing from the scope of the invention.

Figure 3A:
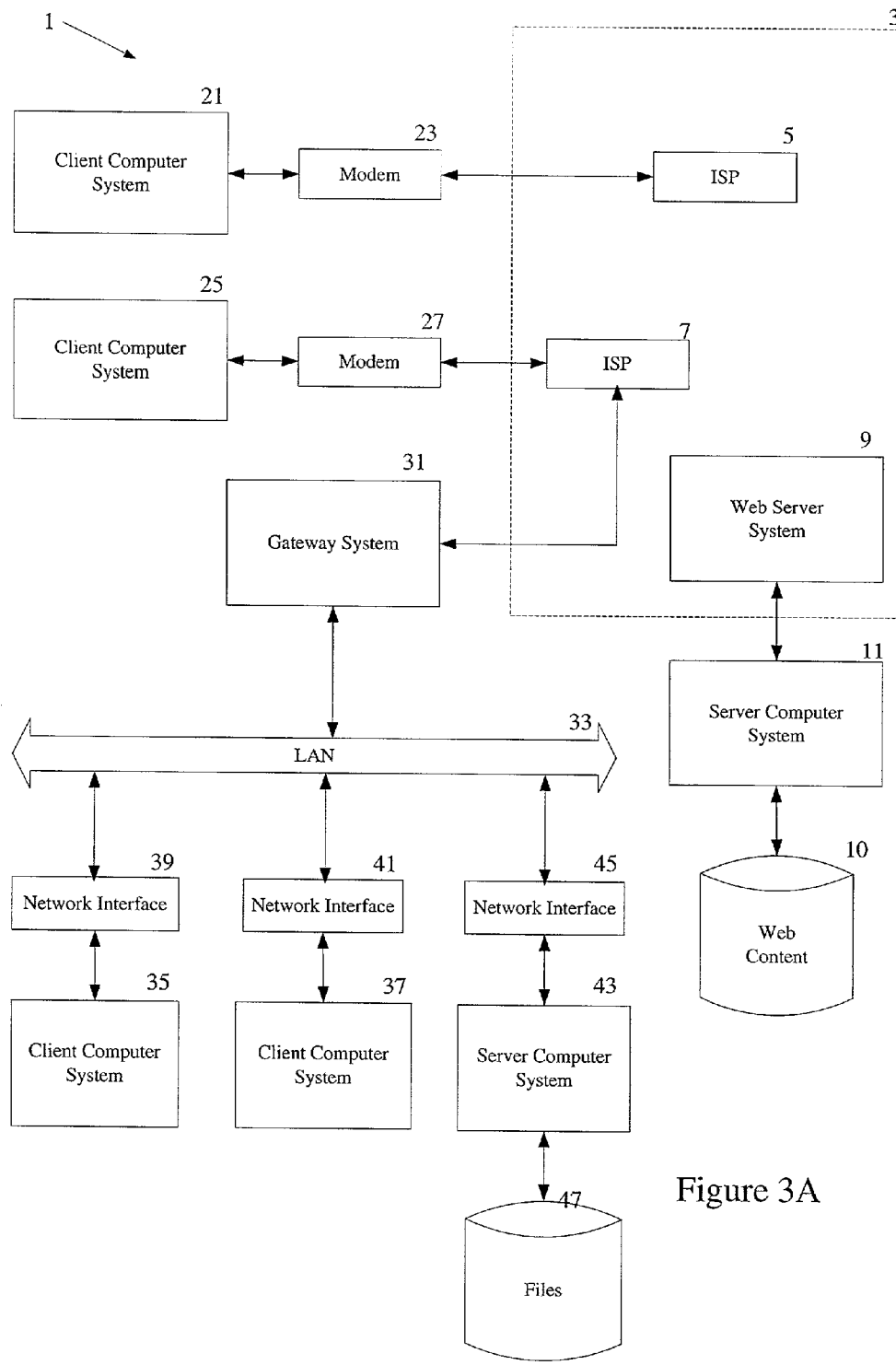
FIG. 3A is a diagram of one embodiment of an operating environment suitable for practicing the present invention.
Figure 3B:
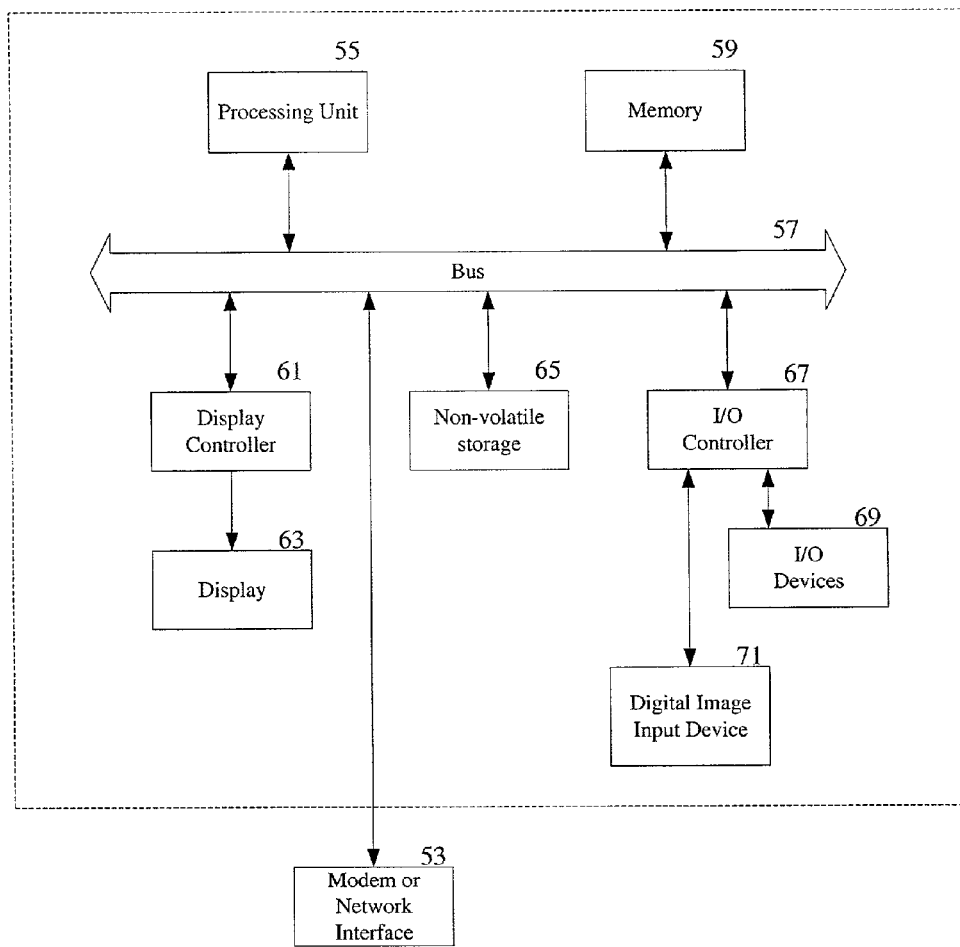
FIG. 3B is a diagram of one embodiment of a computer system suitable for use in the operating environment of FIG. 3A.

The following description of FIGS. 3A-B is intended to provide an overview of computer hardware and other operating components suitable for implementing the invention, but is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network having a physical or wireless infrastructure, or a combination of both.

FIG. 3A shows several computer systems that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7, through either physical or wireless interfaces. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 4A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, a handheld wireless device, or other such computer system. Similarly, the ISP 7 provides Internet connectivity for client systems 25, 35, and 37, although as shown in FIG. 4A, the connections are not the same for these three computer systems. Client computer system 25 is coupled through a modem interface 27 while client computer systems 35 and 37 are part of a LAN. While FIG. 4A shows the interfaces 23 and 27 as generically as a "modem," it will be appreciated that each of these interfaces can be an analog modem, ISDN modem, cable modem, satellite transmission interface (e.g. "Direct PC"), radio frequency (RF), cellular, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 3B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g. "Direct PC"), radio frequency (RF), cellular, or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display. The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the term "computer-readable medium"

includes any type of storage device that is accessible by the processor 55 and also encompasses a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 3B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

Security for peer-to-peer networks has been described. Although specific embodiments have been illustrated and described herein, it will be appreciated by those of ordinary skill in the art that any arrangement which is calculated to achieve the same purpose may be substituted for the specific embodiments shown. The terminology used in describing the peer-to-peer networks is intended to cover all networks, including public and private, local and wide area, wired and wireless. Furthermore, this application is intended to cover any adaptations or variations of the present invention. Therefore, it is manifestly intended that this invention be limited only by the following claims and equivalents thereof.

What is claimed is:

1. A computerized method comprising:
monitoring a peer-to-peer network for suspicious activity based on patterns of activity; and
performing an action associated with a suspicious pattern of activity when the suspicious pattern of activity is detected in the peer-to-peer network, the suspicious pattern of activity defined by a set of rules for detecting at least one of Trojan horse code, viruses, a user browsing data across peers, unwanted user activity, and malicious code attempting to contact a home location;
wherein the peer-to-peer network permits peers to connect and operate substantially without a server by utilizing the server, at most, for providing addresses for the peers in the peer-to-peer network;
wherein the suspicious pattern of activity is defined in terms of a configuration of shared data on a peer, the configuration establishing a baseline of authorized shares and permissions in association with the shared data;
wherein monitoring a peer-to-peer network comprises evaluating a change with respect to the shared data on a peer in the peer-to-peer network, the change being made with respect to the baseline.

2. The computerized method of claim 1, wherein monitoring a peer-to-peer network comprises:
evaluating network traffic among peers in the peer-to-peer network.

3. The computerized method of claim 1, wherein a pattern of activity is defined in terms of a threshold value of network traffic in the peer-to-peer network.

4. The computerized method of claim 1, wherein a pattern of activity is defined in terms of network traffic in the peer-to-peer network that uses a specific protocol.

5. The computerized method of claim 1, wherein a pattern of activity is defined in terms of network traffic in the peer-to-peer network having a foreign address.

6. The computerized method of claim 1, wherein the action comprises logging information about the suspicious pattern of activity.

7. The computerized method of claim 1, wherein the action comprises sending an alert about the suspicious pattern of activity.

8. The computerized method of claim 1, wherein the patterns of activity are local to a peer in the peer-to-peer network.

9. The computerized method of claim 1, wherein the patterns of activity are global to the peer-to-peer network.

10. The computerized method of claim 1 wherein the set of rules specifies the patterns of activity as suspicious activity and specifies associated actions.

11. The computerized method of claim 10 further comprising:
refreshing the set of rules when the set of rules changes.

12. A non-transitory computer-readable medium having executable instructions to cause a processor to perform a method comprising:
monitoring a peer-to-peer network for suspicious activity based on patterns of activity; and
performing an action associated with a suspicious pattern of activity when the suspicious pattern of activity is detected in the peer-to-peer network, the suspicious pattern of activity defined by a set of rules for detecting at least one of Trojan horse code, viruses, a user browsing data across peers, unwanted user activity, and malicious code attempting to contact a home location;
wherein the peer-to-peer network permits peers to connect and operate substantially without a server by utilizing the server, at most, for providing addresses for the peers in the peer-to-peer network;
wherein the computer program product is operable such that the suspicious pattern of activity is defined in terms of a configuration of shared data on a peer, the configuration establishing a baseline of authorized shares and permissions in association with the shared data;
wherein the computer program product is operable such that monitoring a peer-to-peer network comprises evaluating a change with respect to the shared data on a peer in the peer-to-peer network, the change being made with respect to the baseline.

13. The non-transitory computer-readable medium of claim 12, wherein the method further comprises:
evaluating network traffic among peers in the peer-to-peer network when monitoring the peer-to-peer network.

14. The non-transitory computer-readable medium of claim 12, wherein a pattern of activity is defined in terms of a threshold value of network traffic in the peer-to-peer network.

15. The non-transitory computer-readable medium of claim 12, wherein a pattern of activity is defined in terms of network traffic in the peer-to-peer network that uses a specific protocol.

16. The non-transitory computer-readable medium of claim 12, wherein a pattern of activity is defined in terms of network traffic in the peer-to-peer network having a foreign address.

17. The non-transitory computer-readable medium of claim 12, wherein the action comprises logging information about the suspicious pattern of activity.

18. The non-transitory computer-readable medium of claim 12, wherein the action comprises sending an alert about the suspicious pattern of activity.

19. The non-transitory computer-readable medium of claim 12, wherein the patterns of activity are local to a peer in the peer-to-peer network.

20. The non-transitory computer-readable medium of claim 12, wherein the patterns of activity are global to the peer-to-peer network.

21. The non-transitory computer-readable medium of claim 12, wherein the set of rules specifies the patterns of activity as suspicious activity and specifies associated actions.

22. The non-transitory computer-readable medium of claim 21, wherein the method further comprises:
refreshing the set of rules when the set of rules changes.

23. A system comprising:
a processor coupled to a memory through a bus;
a network interface coupled to the processor through the bus and further operable to selectively couple to a peer-to-peer network; and
a peer-to-peer security process executed by the processor from the memory to cause the processor to monitor the peer-to-peer network for suspicious activity based on patterns of activity, and to perform an action associated with a suspicious pattern of activity when the suspicious pattern of activity is detected in the peer-to-peer network, the suspicious pattern of activity defined by a set of rules for detecting at least one of Trojan horse code, viruses, a user browsing data across peers, unwanted user activity, and malicious code attempting to contact a home location;
wherein the peer-to-peer network permits peers to connect and operate substantially without a server by utilizing the server, at most, for providing addresses for the peers in the peer-to-peer network;
wherein the system is operable such that the suspicious pattern of activity is defined in terms of a configuration of shared data on a peer, the configuration establishing a baseline of authorized shares and permissions in association with the shared data;
wherein the system is operable such that monitoring a peer-to-peer network comprises evaluating a change with respect to the shared data on a peer in the peer-to-peer network, the change being made with respect to the baseline.

24. The system of claim 23, wherein peer-to-peer security process further causes the processor to evaluate network traffic between the peers in the peer-to-peer network when monitoring the peer-to-peer network.

25. The system of claim 23, wherein the peer-to-peer security process further causes the processor to monitor the peer-to-peer network for a pattern of activity defined in terms of a threshold value of network traffic in the peer-to-peer network.

26. The system of claim 23, wherein the peer-to-peer security process further causes the processor to monitor the peer-to-peer network for a pattern of activity defined in terms of network traffic in the peer-to-peer network that uses a specific protocol.

27. The system of claim 23, wherein the peer-to-peer security process further causes the processor to monitor the peer-to-peer network for a pattern of activity defined in terms of network traffic having a foreign address.

28. The system of claim 23, wherein the peer-to-peer security process further causes the processor to log information about the suspicious pattern of activity when performing the action associated with the suspicious pattern of activity.

29. The system of claim 23, wherein the peer-to-peer security process further causes the processor to send an alert about the suspicious pattern of activity when performing the action associated with the suspicious pattern of activity.

30. The system of claim 23, wherein the system is a peer in the peer-to-peer network and the patterns of activity are local to the system.

31. The system of claim 23, wherein the system is a server in the peer-to-peer network and the patterns of activity are global to the peer-to-peer network.

32. The system of claim 31, wherein the system is a border firewall.

33. The system of claim 31, wherein the system is a domain name server.

34. The system of claim 31, wherein the set of rules specifies the patterns of activity as suspicious activity and specifies associated actions.

35. The system of claim 34, wherein the peer-to-peer security process further causes the processor to refresh the set of rules when the set of rules changes.

36. The computerized method of claim 1, wherein a share configuration loop is executed to detect changes to shares and corresponding permissions, and an action is initiated as a function of a type of the changes.

37. The computerized method of claim 36, wherein the share configuration loop is executed dynamically.

38. The computerized method of claim 36, wherein the share configuration loop is executed on a schedule.

39. The computerized method of claim 36, wherein the share configuration loop examines a current share configuration against a previously recorded shared configuration to detect the changes to the shares and the corresponding permissions.

40. The computerized method of claim 36, wherein, if the change includes an attempt to un-share a file or directory, the action includes a log entry.

41. The computerized method of claim 1, wherein the suspicious pattern of activity includes a number of failed attempts by a computer in accessing an internal peer that exceeds a predetermined number.

42. The computerized method of claim 1, wherein the suspicious pattern of activity includes more than a pre-defined number of internal computers requesting resolution of a single external address within a preset period of time.

43. The computerized method of claim 36, wherein the share configuration loop is executed in parallel with a network traffic loop that detects incoming or outgoing network traffic from a computer as exhibiting an activity pattern defined as suspicious by a rule.

* * * * *